US012258260B2

(12) United States Patent
Zettlitzer et al.

(10) Patent No.: US 12,258,260 B2
(45) Date of Patent: Mar. 25, 2025

(54) CONNECTION APPARATUS FOR ESTABLISHING A FLUIDIC CONNECTION BETWEEN A STORAGE CONTAINER AND ANOTHER FLUIDIC DEVICE AND A CORRESPONDING RING ELEMENT FOR CODING THE STORAGE CONTAINER

(71) Applicant: ECOLAB USA INC., Saint Paul, MN (US)

(72) Inventors: Guenter Zettlitzer, Bergen (DE); Gerold Carlhoff, Tönisvorst (DE)

(73) Assignee: ECOLAB USA INC., Saint Paul, MN (US)

( * ) Notice: Subject to any disclaimer, the term of this patent is extended or adjusted under 35 U.S.C. 154(b) by 286 days.

(21) Appl. No.: 17/650,421

(22) Filed: Feb. 9, 2022

(65) Prior Publication Data

US 2022/0162055 A1 May 26, 2022

Related U.S. Application Data

(63) Continuation of application No. PCT/EP2019/071512, filed on Aug. 9, 2019.

(51) Int. Cl.
*B67D 7/02* (2010.01)
*B67D 7/34* (2010.01)

(52) U.S. Cl.
CPC ............... *B67D 7/344* (2013.01); *B67D 7/02* (2013.01); *B67D 7/0288* (2013.01)

(58) Field of Classification Search
CPC ......... B67D 7/344; B67D 7/02; B67D 7/0288
See application file for complete search history.

(56) References Cited

U.S. PATENT DOCUMENTS

| | | | | |
|---|---|---|---|---|
| 5,957,328 | A * | 9/1999 | Osgar | B67D 7/344 222/105 |
| 6,015,068 | A * | 1/2000 | Osgar | B67D 7/344 222/105 |
| 6,021,802 | A | 2/2000 | Leifels et al. | |
| 6,412,666 | B1 * | 7/2002 | Hogan | B67D 7/344 222/325 |

(Continued)

FOREIGN PATENT DOCUMENTS

EP 3326579 A1 5/2018

OTHER PUBLICATIONS

International Searching Authority in connection with PCT/EP2019/071512 filed Aug. 9, 2019, "The International Search Report and the Written Opinion of the International Searching Authority, or the Declaration", 15 pages, mailed Apr. 29, 2020.

*Primary Examiner* — Frederick C Nicolas
(74) *Attorney, Agent, or Firm* — McKee, Voorhees & Sease, PLC

(57) ABSTRACT

A connection apparatus is used to fluidly connect a storage container and another fluidic device. The connection apparatus utilizes a probe that is inserted into the container to extract fluid from inside the container. A connection piece can be used to connect to the other fluidic device. A support is mounted on the container, and includes a spatial coding that is interlocked with a counter-coding structure. The spatial coding is used to ensure that the correct support is used with the container containing a fluid. A ring element codes the system to indicate the fluid or fluid type.

13 Claims, 6 Drawing Sheets

(56) References Cited

U.S. PATENT DOCUMENTS

| | | | | |
|---|---|---|---|---|
| 8,302,813 | B2 * | 11/2012 | Chen | B67D 7/0288 222/541.2 |
| 9,090,450 | B2 | 7/2015 | Reimann et al. | |
| 9,126,749 | B2 * | 9/2015 | Hodges | B67D 7/0294 |
| 9,708,172 | B2 * | 7/2017 | Reimann | B67D 7/344 |
| 2009/0020176 | A1 * | 1/2009 | Hasegawa | B67D 7/0261 222/105 |
| 2010/0147894 | A1 * | 6/2010 | Reimann | B67D 7/34 222/325 |
| 2011/0309114 | A1 | 12/2011 | Chen | |
| 2015/0298960 | A1 | 10/2015 | Hennen | |
| 2015/0329348 | A1 * | 11/2015 | Reimann | B67D 7/344 222/129 |

* cited by examiner

CONNECTION APPARATUS FOR ESTABLISHING A FLUIDIC CONNECTION BETWEEN A STORAGE CONTAINER AND ANOTHER FLUIDIC DEVICE AND A CORRESPONDING RING ELEMENT FOR CODING THE STORAGE CONTAINER

CROSS-REFERENCE TO RELATED APPLICATIONS

This application is a Continuation Application of PCT/EP2019/071512, filed Aug. 9, 2019, the entire contents of which are hereby incorporated by reference in their entirety.

FIELD OF THE INVENTION

The invention relates to a connection apparatus for establishing a fluidic connection between a storage container and another fluidic device.

The invention further relates to a corresponding ring element for coding a storage container, a system with an aforementioned connection apparatus and an aforementioned ring element and a kit of parts for establishing such systems.

BACKGROUND OF THE INVENTION

A connection apparatus for establishing a fluidic connection between a storage container and another fluidic device like a dispensing device is known from document U.S. Pat. No. 9,090,450 B2. This document describes a dispensing assembly with a connection unit for establishing a fluidic connection between a storage container and the dispensing assembly, the connection unit comprising: (i) an extracting probe for extracting liquid from said storage container; (ii) a connection part for connecting the rest of the dispensing assembly; and (iii) a support in form of an insert component for mounting a container outlet of the storage container on the connection unit such that the extracting probe extends into the container outlet, wherein the insert component has a spatial coding structure for forming a joint of interlocking parts together with a spatially compatible counter-coding structure on the upper part of a cap capping the container outlet, wherein only spatially compatible coding structures of connection apparatus and ring element permit the storage container to be mounted on the dispensing assembly.

Other connection apparatuses are intended for mounting on the storage container and are intended for specific liquids only.

Therefore, one object underlying the present invention is to provide measures to prevent confusion and mistakes when mounting such a connection apparatus for a specific liquid on a storage container.

SUMMARY OF THE INVENTION

This object is achieved by the invention as defined by the independent claims. The dependent claims detail advantageous embodiments of the invention.

According to various aspects of the invention, the connection apparatus for extracting liquid from a storage container comprises: (i) an extracting probe for extracting liquid from said storage container; (ii) a connection piece for connecting the other fluidic device; and (iii) a support for mounting the connection apparatus on a container outlet of the storage container such that the extracting probe extends into the container outlet, wherein the support has a spatial coding structure for forming a joint of interlocking parts together with a spatially compatible counter-coding structure of a ring element embracing the container outlet, wherein only spatially compatible coding structures of connection apparatus and ring element permit the apparatus to be mounted on the storage container. By this measure mix-ups can be safely avoided.

According to a preferred embodiment of the connection apparatus according to the invention, the spatial coding structure is a crown-like protrusion-recess structure for forming a joint of interlocking parts together with a protrusion-recess structure of the spatially suitable counter-coding structure of the ring element.

Preferably the coding of the crown-like protrusion-recess structure is given by the form and/or number and/or arrangement of the protrusions and recesses of said protrusion-recess structure.

In accordance with another aspect of the connection apparatus according to the invention, the connection apparatus further comprises a marking corresponding to the spatial coding structure, which is clearly visible in operation of the connection apparatus. The marking is preferably located at the top of the connection apparatus.

The marking especially is a colour marking. The marking might comprise more than one colour, but preferably the marking comprises only one colour.

In accordance with another aspect of the connection apparatus according to the invention, the extracting probe comprises a hollow needle for penetrating a membrane at the container outlet, wherein said hollow needle forms a channel though which liquid flows when extracting the liquid from the storage container.

In accordance with yet another aspect of the connection apparatus according to the invention, the connection apparatus further comprises a check-valve in a liquid path between the extracting probe and the connection piece.

According to various other aspects of the invention, the ring element for coding a storage container is fastenable to a container outlet of said storage container such that the ring element embraces the container outlet. The ring element has a spatial counter coding structure for forming a joint of interlocking parts together with a spatially compatible coding structure of an apparatus which can be mounted on the container outlet, in particular an aforementioned connection apparatus.

In this case the spatial counter coding structure is a crown-like protrusion-recess structure for forming a joint of interlocking parts together with the protrusion-recess structure of the spatially compatible coding structure of the connection apparatus.

Preferably the coding of the crown-like counter structure is given by the form and/or number and/or arrangement of the protrusions and recesses of the protrusion-recess structure.

According to a preferred embodiment of the ring element according to the invention, the ring element comprises a systematic marking, especially colour marking, clearly visible in operation of the connection apparatus, which marking corresponds to the spatial counter coding structure.

According to another preferred embodiment of the ring element according to the invention, the ring element further comprises at least one snapper element for establishing a snap-fit connection for fastening the ring element to the container outlet.

The invention further relates to a system for ensuring a desired combination of storage container and connection apparatus when using the connection apparatus for establishing a fluidic connection between the storage container and another fluidic device, the system comprising the aforementioned liquid extraction and a corresponding aforementioned ring element.

The invention finally relates to a kit of parts for establishing systems for ensuring a desired combination of storage container and connection apparatus when using the connection apparatus for establishing a fluidic connection between the storage container and another fluidic device, the kit comprising a number of aforementioned connection apparatuses with different spatial coding structures and a number of aforementioned ring elements with different spatial counter coding structures.

BRIEF DESCRIPTION OF THE DRAWINGS

Additional details, features, characteristics and advantages of the object of the invention are disclosed in the figures and the following description of the respective figures, which—in exemplary fashion—show one embodiment and an example of a dispensing system according to the invention. In the drawings.

DETAILED DESCRIPTION OF THE DRAWINGS

Figure 1:
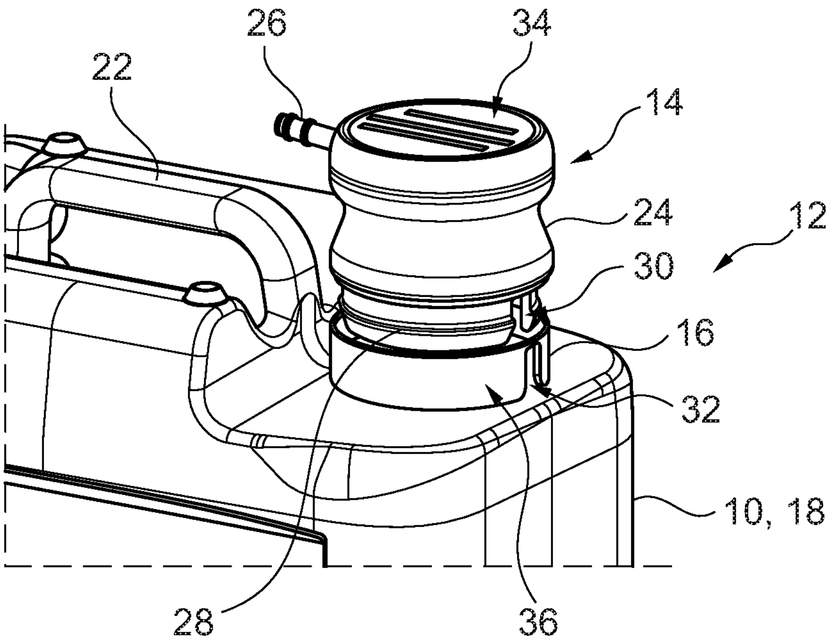
FIG. 1 shows an overall arrangement of a storage container and a system with a connection apparatus for establishing a fluidic connection between the storage container and other fluidic devices according to a preferred embodiment of the invention.

FIG. 1 shows an overall arrangement of a storage container 10 for fluids and a system 12 with a connection apparatus 14 for establishing a fluidic connection between the storage container 10 and another fluidic device (not shown) and a corresponding ring element 16 for coding the storage container 10. The fluid storage container 10 is formed as a canister 18 with a container outlet 20 (explicitly shown in FIGS. 6 and 13) and a handle 22. The system 12 is mounted on said container outlet 20 (whereby this outlet 20 is not visible in FIG. 1).

The ring element 16 is fastened to the container outlet 20 such that the ring element 16 embraces the container outlet 20. The connection apparatus 14 comprises a main body 24, a connection piece 26 for connecting the other fluidic device and a support 28 for mounting the connection apparatus 14 on the container outlet 20 of the storage container 10.

The support 28 has a spatial coding structure 30 for forming a joint of interlocking parts together with a spatially compatible counter-coding structure 32 (visible in FIGS. 6 and 9 to 12) of the ring element 16 in such way that only spatially compatible coding structures 30, 32 of connection apparatus 14 and ring element 16 permit the connection apparatus 14 to be mounted on the container outlet 20 (the parts interact in a similar way to key and lock). Each of the elements 14, 16 of the system 12 for ensuring a desired combination of storage container 10 and connection apparatus 14, namely the connection apparatus 14 itself and the ring element 16, is labeled with a marking 34, 36 according to a marking scheme. The marking type used in this embodiment is a colour marking for both elements 14, 16.

Figure 2:
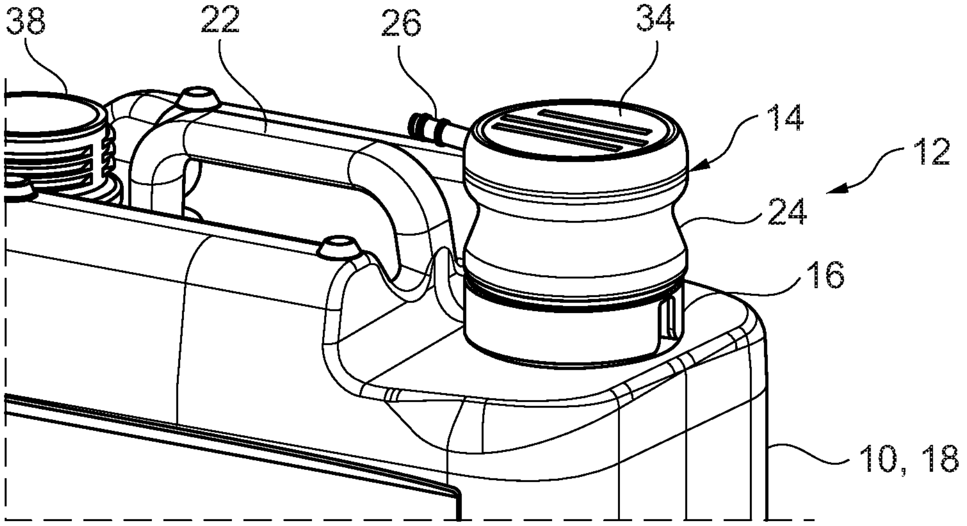
FIG. 2 shows the overall arrangement with the connection apparatus mounted on a container outlet of the storage container.

FIG. 2 shows the overall arrangement of a storage container 10 and the system 12 with the connection apparatus 14 and the corresponding ring element 16, wherein coding and counter coding structures 30, 32 fit together and the connection apparatus 14 is mounted on the container outlet 20. The counter-coding structure 32 coats the coding structure. The ring element 16 can be understood as a spacer for the installation of the connection apparatus 14 on the container outlet 20. If the coding/counter coding structures 30, 32 do not fit together, the ring element 16 acts as the spacer and prevents the fluidic connection. Furthermore, a ventilation opening 38 of the container 10 is visible in FIG. 2.

Figure 3:
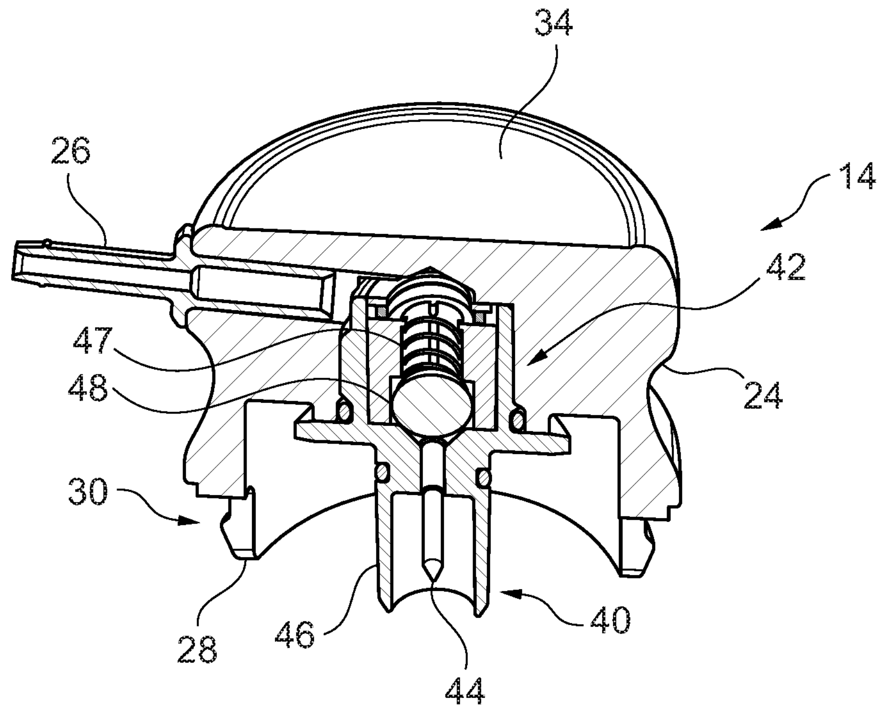
FIG. 3 shows a cut of the connection apparatus in 3D representation.

FIG. 3 shows the connection apparatus 14 in a cutaway (sectional) 3*d* view. In addition to the components referred to above (main body 24, connection piece 26 for connecting the other fluidic device and support 28 for mounting the connection apparatus 14 on the container outlet 20 of the storage container 10), the connection apparatus 14 further comprises an extraction probe 40 for extracting liquid from said storage container 10 and a check-valve 42 in a liquid path between the extracting probe 40 and the connection piece 26. The check-valve 42 is located in the center of the main body 24 and comprises a spring 47 and a ball 48 as a valve member. The extracting probe 40 comprises a hollow needle 44 for penetrating a membrane (shown e.g. in FIG. 6) in the container outlet 20 and a sleeve 46 surrounding the hollow needle radially. When the connection apparatus 14 extracts liquid from the storage container 10 the liquid flows through the hollow needle 44, the check-valve 42 and the connection piece 26. The main body 24 of the connection apparatus is made of plastic.

Figure 4:
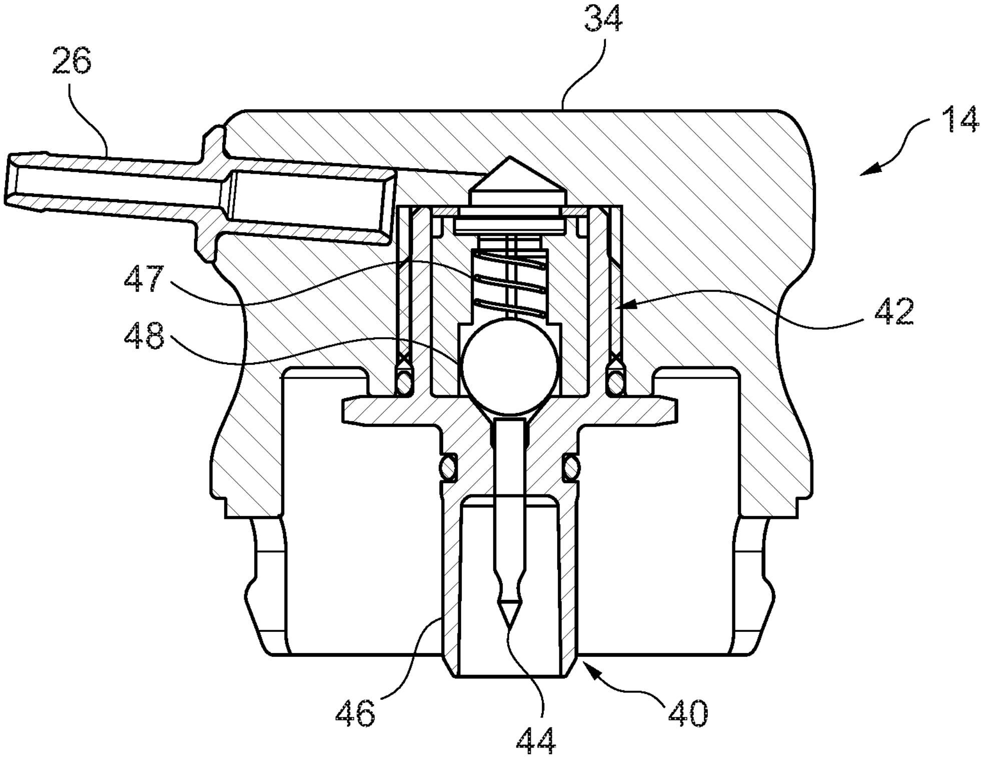
FIG. 4 shows the connection apparatus in a sectional view.

FIG. 4 shows the connection apparatus 14 in a sectional view. Extracting probe 40 and check-valve 42 form a single component 40, 42. This single component 40, 42 is—as well as the connection piece 26 pressed into the main body 24.

Figure 5:
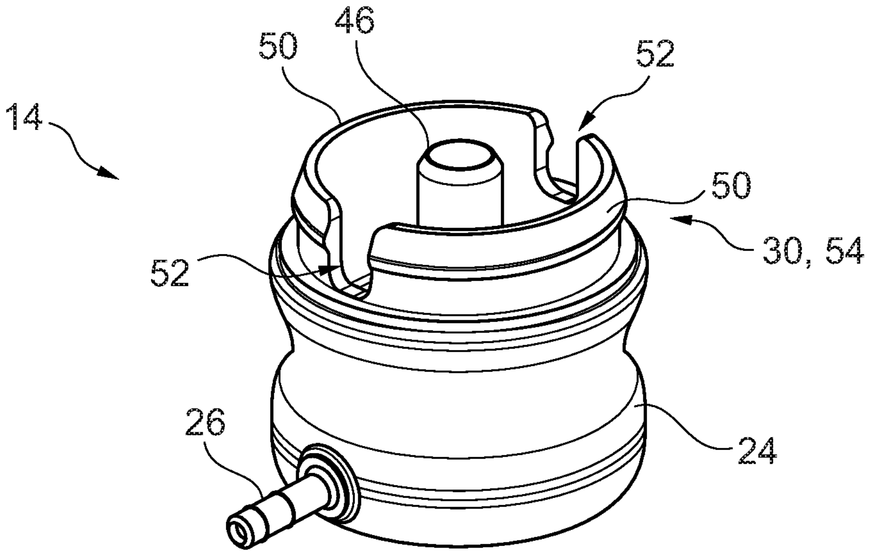
FIG. 5 shows the connection apparatus in 3D representation upside down.

FIG. 5 shows the connection apparatus 14 in an upside down presentation. In this presentation two protrusions 50 and two recesses 52 of the coding structure 30 are visible. The coding structure 30 therefore might be called a crown-like protrusion-recess structure 54. The crown-like protrusion-recess structure 54 is interacting with the coding structure 32 of the ring element 16, which is a corresponding crown-like protrusion-recess structure 56 (shown in FIG. 6).

Figure 6:
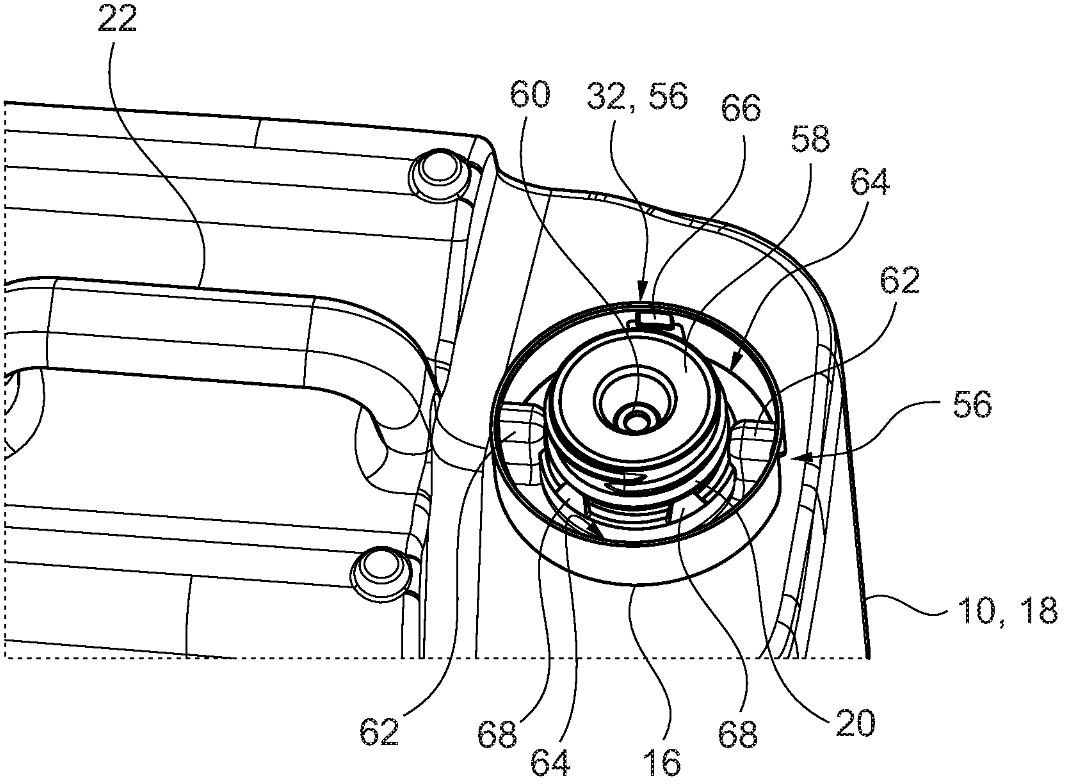
FIG. 6 shows the storage container and the ring element for coding the storage container surrounding the container outlet.

FIG. 6 shows the storage container 10 and the ring element 16 for coding the storage container 10 surrounding the container outlet 20. Within the container outlet 20 an insert component 58 (or a head of a suction lance, respectively) with the membrane 60 is visible. The counter-coding structure 32 of the ring element 16 comprises two protrusions 62 and two recesses 64 of the counter-coding structure 32. The counter-coding structure 32 therefore might be called a crown-like protrusion-recess structure 56. Each of the recesses 64 has the form of a semicircular slot in which the protrusion 52 of the corresponding coding structure 30 can engage. The ring element 16 further comprises nose structures 66 for a detachable clip-on connection between connection apparatus 14 and ring element 16 as well as snapper elements 68 for establishing a snap-fit connection for fastening the ring element 16 to the container outlet 20. The snapper elements 68 are interacting with an external screw thread 70 of the container outlet 20.

Figure 7:
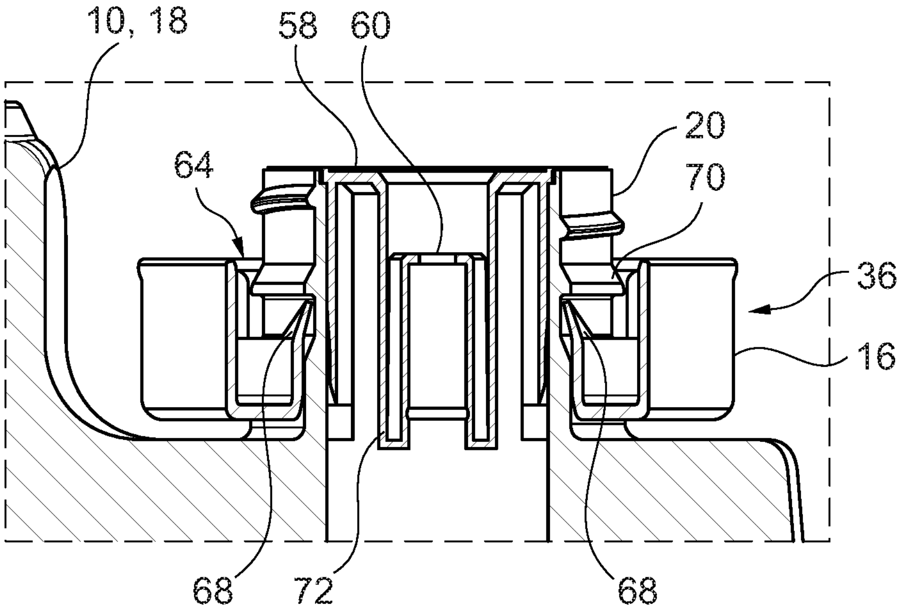
FIG. 7 shows a first sectional view of the ring element for coding the storage container surrounding the container outlet.

FIG. 7 shows the ring element 16 for coding the storage container 10 surrounding the container outlet 20 in a first sectional view (cut like the cut for a piece of pie). Parts of the insert component 58 are forming a guiding structure 72 for the sleeve 46 of the extracting probe 40. The membrane 60 is located at the top part of said guiding structure 72.

Figure 8:
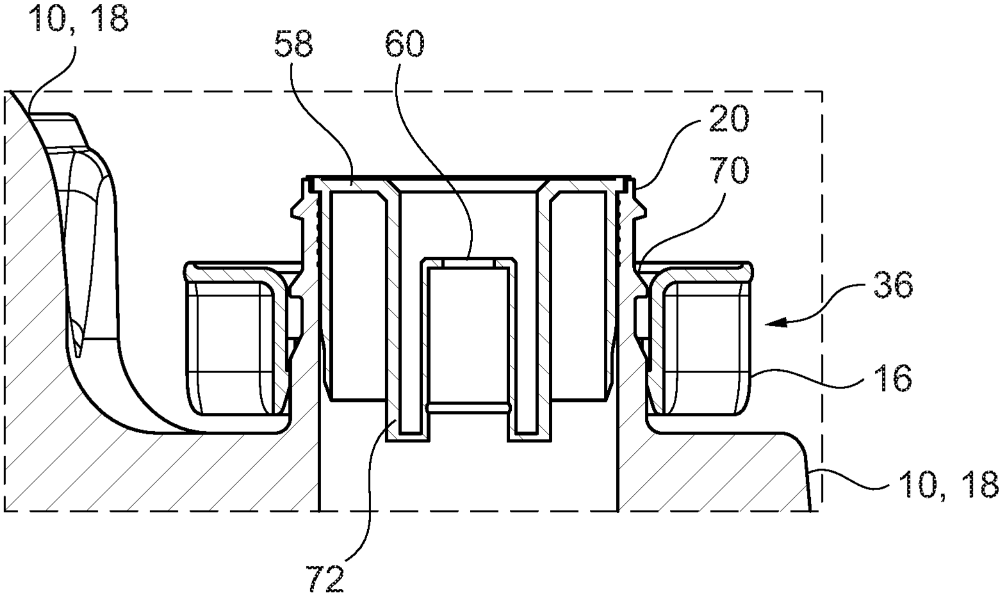
FIG. 8 shows the scene from FIG. 7 in another sectional view.

FIG. 8 shows the ring element 16 for coding the storage container 10 surrounding the container outlet 20 (planar cut).

FIGS. 9 to 12 are showing ring elements 16 with different spatial counter-coding structures 32. These different spatial counter-coding structures 32 are associated with a colour code given by table 1. The colour code is used for the marking 34 executed as label and the marking 36 executed as material colour of the ring element 16.

TABLE 1 coding table specifying the correlation between the coding structure and the colour code

| coding structure | 1 protrusion | 2 protrusions (symmetrical) | 3 protrusions (symmetrical) | 2 protrusions (asymmetrical) |
|---|---|---|---|---|
| colour code | red | green | yellow | grey |

Figure 9:
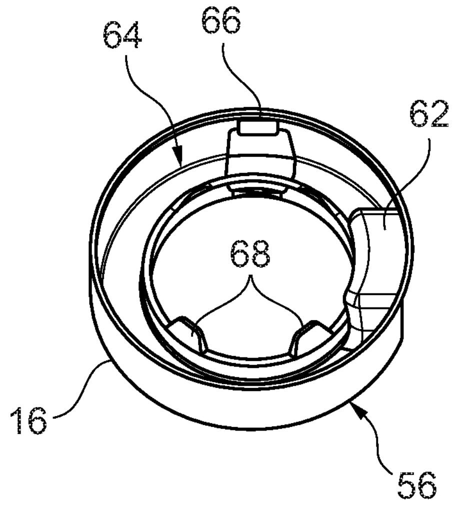
FIG. 9 shows a first embodiment of the ring element.

FIG. 9 shows a first embodiment of the ring element 16 comprising a spatial counter-coding structure 32 with only one protrusion 50. According to table 1 this spatial counter-coding structure 32 is linked to the colour red of the colour marking.

Figure 10:
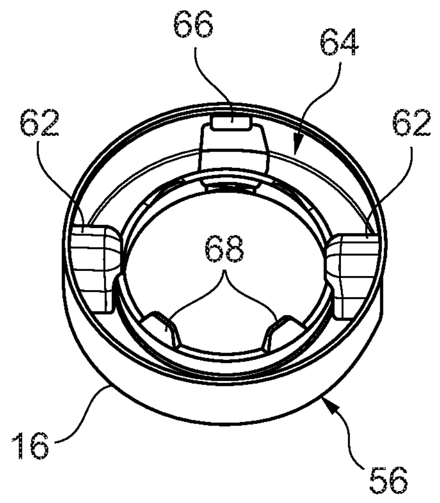
FIG. 10 shows a second embodiment of the ring element.

FIG. 10 shows a second embodiment of the ring element 16 comprising a spatial counter-coding structure 32 with two protrusions 50 arranged opposite to each other. According to table 1 this spatial counter-coding structure 32 is linked to the colour green of the colour marking.

Figure 11:
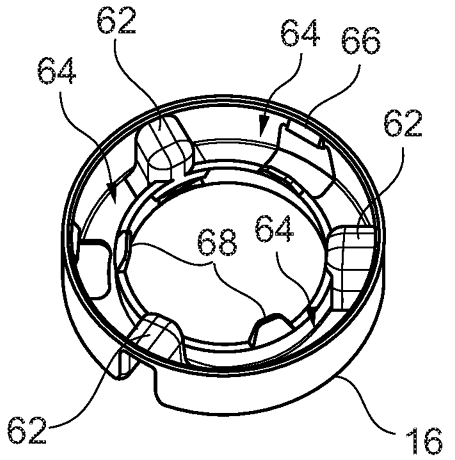
FIG. 11 shows a third embodiment of the ring element.

FIG. 11 shows a third embodiment of the ring element 16 comprising a spatial counter-coding structure 32 with three symmetrically arranged protrusions 50. According to table 1 this spatial counter-coding structure 32 is linked to the colour yellow of the colour marking.

Figure 12:
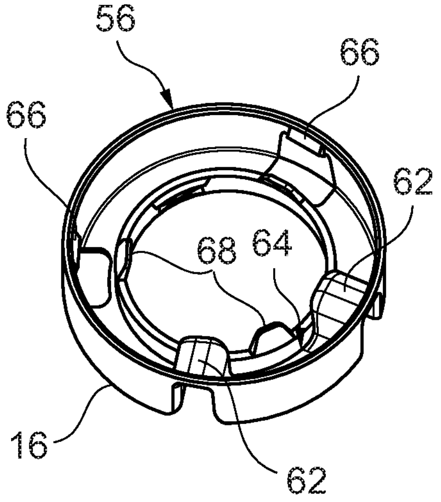
FIG. 12 shows a fourth embodiment of the ring element.

FIG. 12 shows a fourth embodiment of the ring element 16 comprising a spatial counter-coding structure 32 with two asymmetrically arranged protrusions 50. According to table 1 this spatial counter-coding structure 32 is linked to the colour grey of the colour marking.

Figure 13:
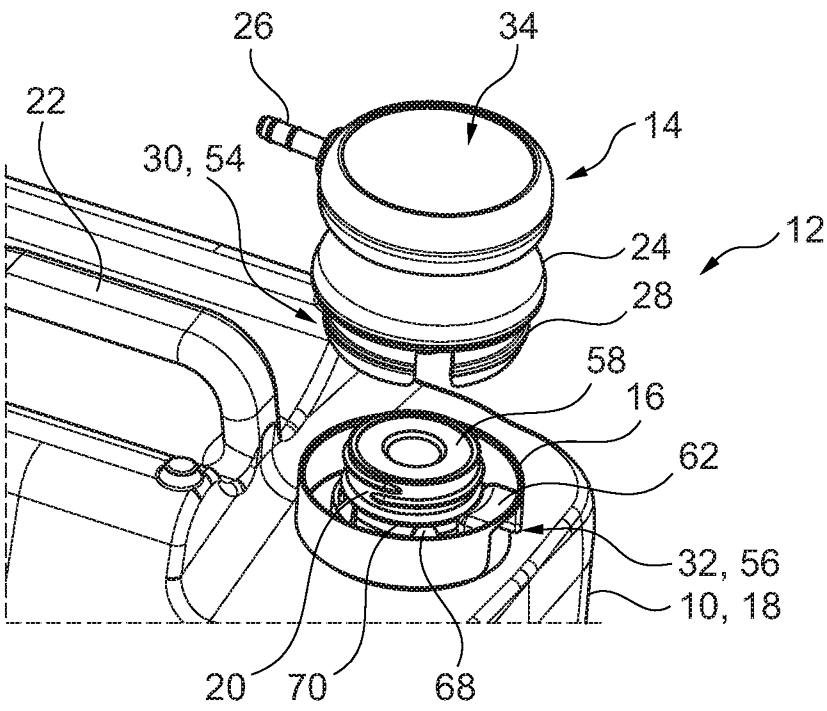
FIG. 13 shows another overall arrangement of the storage container and the system with a connection apparatus shown in FIGS. 1 and 2.
Figure 14:
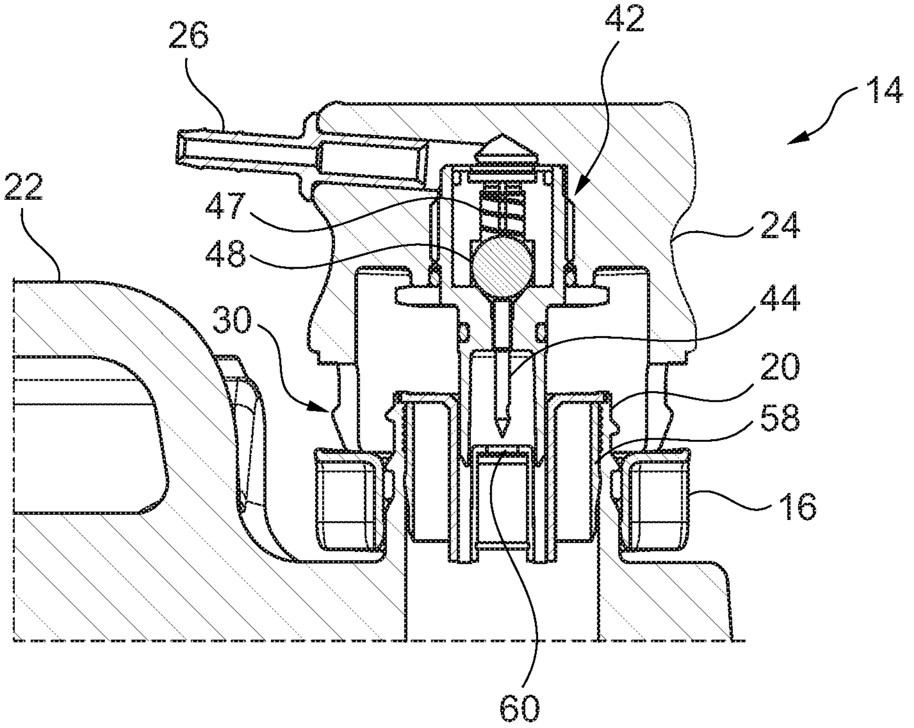
FIG. 14 shows the container outlet and the connection apparatus in a sectional view.

FIG. 13 shows another overall arrangement of the storage container 10 and the system 12 with the connection apparatus 14 and the ring element 16 shown in FIGS. 1 and 2; and FIG. 14 shows the container outlet 20 and parts of the storage container 10 in the surrounding of the container outlet 20 together with the connection apparatus 14 and the ring element 16 in a sectional view. The mounting of the connection apparatus 14 to the container outlet 20 is blocked by the ring element 16 because the spatial coding structure 30 of the connection apparatus 14 and the spatial counter-coding structure 32 of the ring element 16 do not fit. In this combination the hollow needle 44 does not penetrate the membrane 60 in the container outlet 20 through which the liquid flows when extracting the liquid from the storage container 10.

It should be noted that, as used in this specification and the appended claims, the singular forms "a", "an" and "the" include plural referents unless the content clearly dictates otherwise. Thus, for example, reference to a composition containing "a compound" includes a mixture of two or more compounds. It should also be noted that the term "or" is generally employed in its sense including "and/or" unless the content clearly dictates otherwise.

REFERENCE SIGNS

10 storage container
12 system
14 connection apparatus
16 ring element
18 canister
20 container outlet
22 handle
24 main body (connection apparatus)
26 connection piece
28 support
30 spatial coding structure (connection apparatus)
32 spatial counter-coding structure (Ring element)
34 marking
36 marking
38 ventilation opening
40 extracting probe
42 check-valve
44 hollow needle
46 sleeve
47 spring
48 ball
50 protrusion
52 recess
54 protrusion-recess structure
56 protrusion-recess structure
58 insert component
60 membrane
62 protrusion
64 recess
66 nose structure
68 snapper element
70 screw thread
72 guiding structure

What is claimed is:

1. A connection apparatus to be used with a storage container, the connection apparatus comprising:

an extracting probe for extracting liquid from said storage container;

a connection piece; and a support for mounting the connection apparatus on a container outlet of the storage container such that the extracting probe extends into the container outlet, wherein the support has a spatial coding structure for forming a joint of interlocking parts together with a spatially compatible counter-coding structure of a ring element embracing the container outlet, further wherein the coding structure of the connection apparatus and the counter-coding structure of the ring element permit the connection apparatus to be mounted on the storage container.

2. The connection apparatus according to claim 1, wherein the coding structure is a protrusion-recess structure for forming the joint of interlocking parts together with a protrusion-recess structure of the counter-coding structure of the ring element.

3. The connection apparatus according to claim 2, wherein coding of the protrusion-recess structure of the coding structure is given by form, number, or arrangement of protrusions and recesses of said protrusion-recess structure of the coding structure.

4. The connection apparatus according to claim 1, further comprising a systematic marking corresponding to the coding structure, wherein the marking is clearly visible in operation of the connection apparatus.

5. The connection apparatus according to claim 4, wherein the marking is a colour marking.

6. The connection apparatus according to claim 1, wherein the extracting probe comprises a hollow needle for penetrating a membrane in the container outlet through which the liquid flows when extracting the liquid from the storage container.

7. The connection apparatus according to claim 1, further comprising a check-valve in a liquid path between the extracting probe and the connection piece.

8. A ring element for coding a storage container, wherein the ring element is fastenable to a container outlet of said storage container such that the ring element embraces the container outlet, further wherein the ring element has a spatial counter coding structure for forming a joint of interlocking parts together with a spatially compatible coding structure of an apparatus which can be mounted on the container outlet;

further wherein the ring element further comprises a systematic marking clearly visible during operation of the apparatus, wherein the marking corresponds to the counter coding structure and the marking is a colour marking.

9. The ring element according to claim 8, wherein the counter coding structure is a protrusion-recess structure for forming the joint of interlocking parts together with a protrusion-recess structure of the coding structure of the apparatus.

10. The ring element according to claim 9, wherein coding of the protrusion-recess structure of the counter coding structure is given by form, number, or arrangement of protrusions and recesses of the protrusion-recess structure of the counter coding structure.

11. The ring element according to claim 8, further comprising at least one snapper element for establishing a snap-fit connection for fastening the ring element to the container outlet.

12. A system for ensuring a desired combination of storage container and connection apparatus, the system comprising; the connection apparatus wherein the connection apparatus comprises:

an extracting probe for extracting liquid from said storage container;

a connection piece; and a support for mounting the connection apparatus on a container outlet of the storage container such that the extracting probe extends into the container outlet;

wherein the support has a spatial coding structure for forming a joint of interlocking parts together with a spatially compatible counter-coding structure of a ring element embracing the container outlet, wherein the coding structure of the connection apparatus and the counter-coding structure of the ring element permit the connection apparatus to be mounted on the storage container.

13. A kit for establishing systems for ensuring a desired combination of storage container and one of two or more connection apparatuses, the kit comprising the two or more connection apparatuses, wherein each of the two or more connection apparatuses comprises:

an extracting probe for extracting liquid from said storage container;

a connection piece for connecting the other fluidic device; and a support for mounting the connection apparatus on a container outlet of the storage container such that the extracting probe extends into the container outlet;

wherein the support of each of the two or more connection apparatuses comprises a spatial coding structure and wherein the coding structure of at least two of the two or more connection apparatuses are different; and two or more ring elements, wherein each of the two or more ring elements comprises:

a spatial counter-coding structure;

wherein each of the two or more ring elements is fastenable to the container outlet of said storage container such that when one of the two or more ring elements is fastened to the container outlet that one ring element embraces the container outlet;

wherein each counter-coding structure is compatible with at least one of the coding structures of the two or more connection apparatuses such that each set of coding structure and compatible counter-coding structure is configured to form a joint of interlocking parts together; and wherein at least two of the counter-coding structures of the two or more ring elements are different.

* * * * *